US008498401B2

(12) United States Patent
Shafique (10) Patent No.: US 8,498,401 B2
(45) Date of Patent: Jul. 30, 2013

(54) MOBILE-TO-MOBILE CALL DETERMINATION

(75) Inventor: Muhammad Shafique, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 249 days.

(21) Appl. No.: 13/188,373

(22) Filed: Jul. 21, 2011

(65) Prior Publication Data

US 2013/0022193 A1    Jan. 24, 2013

(51) Int. Cl.
*H04M 7/00* (2006.01)

(52) U.S. Cl.
USPC .......................................... 379/229; 455/433

(58) Field of Classification Search
USPC ............... 379/229, 230, 221.13; 455/433, 455/432.1
See application file for complete search history.

(56) References Cited

U.S. PATENT DOCUMENTS

| 6,731,325 | B1 | 5/2004 | Qi et al. |
| 6,771,953 | B1 * | 8/2004 | Chow et al. ................... 455/417 |
| 7,072,678 | B2 | 7/2006 | Allison |
| 7,103,669 | B2 | 9/2006 | Apostolopoulos |
| 7,171,460 | B2 | 1/2007 | Kalavade et al. |
| 7,418,497 | B2 | 8/2008 | Hagale et al. |
| 7,689,650 | B1 | 3/2010 | Sanghavi et al. |
| 7,701,925 | B1 | 4/2010 | Mason et al. |
| 7,787,445 | B2 | 8/2010 | Marsico |
| 7,899,862 | B2 | 3/2011 | Appelman et al. |
| 8,214,253 | B1 * | 7/2012 | Harris et al. ................. 705/14.1 |
| 8,285,251 | B2 * | 10/2012 | Bonner et al. ................ 455/406 |
| 8,406,252 | B1 * | 3/2013 | Wuthnow et al. ............. 370/466 |
| 2003/0153283 | A1 * | 8/2003 | Kuwazoe ........................ 455/90 |
| 2004/0186887 | A1 | 9/2004 | Galli et al. |
| 2004/0207508 | A1 | 10/2004 | Lin et al. |
| 2005/0108417 | A1 | 5/2005 | Haumont |
| 2006/0023729 | A1 | 2/2006 | Choi et al. |
| 2006/0234703 | A1 | 10/2006 | Wuthnow et al. |

(Continued)

FOREIGN PATENT DOCUMENTS

| WO | WO2005055504 A1 | 6/2005 |
| WO | WO2006012911 A1 | 2/2006 |

(Continued)

OTHER PUBLICATIONS

PCT Search Report and Written Opinion mailed Dec. 26, 2012 for PCT Application No. PCT/US12/47085, 9 pages.

(Continued)

*Primary Examiner* — William Deane, Jr.
(74) *Attorney, Agent, or Firm* — Lee & Hayes, PLLC (57) ABSTRACT

Methods and systems for determining call types are described herein. An intelligent node is configured to determine whether a call is a mobile-to-mobile call between subscribers of a telecommunication service provider based on a response to a request from the intelligent node. The intelligent node may further be configured to send a state request to an interconnecting network of the telecommunication service provider. A node of the interconnecting network determines whether a serving subscriber identifier is included in a routing database of that node. If the identifier is not included, the node responds with an error message. If the identifier is included, the node communicates with a relay function and responds to the request with a state received from the relay function. The intelligent node may also be configured to send an ENUM query and receive an identifier of the telecommunication service provider associated with the serving subscriber.

20 Claims, 5 Drawing Sheets

U.S. PATENT DOCUMENTS

| | | | |
|---|---|---|---|
| 2006/0258329 | A1 | 11/2006 | Gruchala et al. |
| 2007/0230680 | A1* | 10/2007 | McCann .................. 379/221.13 |
| 2007/0250449 | A1* | 10/2007 | Seidler ............................ 705/60 |
| 2008/0137541 | A1 | 6/2008 | Agarwal et al. |
| 2008/0244019 | A1 | 10/2008 | Mellor et al. |
| 2009/0005037 | A1 | 1/2009 | Noldus et al. |
| 2009/0034610 | A1 | 2/2009 | Lee et al. |
| 2009/0088179 | A1* | 4/2009 | Stuempert et al. ......... 455/456.1 |
| 2010/0022232 | A1 | 1/2010 | Bonner et al. |
| 2010/0034106 | A1 | 2/2010 | Hu et al. |
| 2010/0040347 | A1 | 2/2010 | Kent, Jr. et al. |
| 2010/0144344 | A1* | 6/2010 | Jiang ............................. 455/433 |
| 2010/0272101 | A1 | 10/2010 | Ku et al. |

FOREIGN PATENT DOCUMENTS

| | | |
|---|---|---|
| WO | WO2007016472 A2 | 2/2007 |
| WO | WO2008070869 A2 | 6/2008 |
| WO | WO2010052570 A1 | 5/2010 |

OTHER PUBLICATIONS

PCT Search Report and Written Opinion mailed May 4, 2012 for PCT Application No. PCT/US11/54785, 9 pages.

* cited by examiner

MOBILE-TO-MOBILE CALL DETERMINATION

BACKGROUND

Providers of telecommunication services typically offer plans that incentivize subscribers to call at non-peak hours, such as nights and weekends. These plans also often include discounted or free calls between subscribers of a same service provider. Calls between subscribers to a same service are typically referred to as "mobile-to-mobile" calls, regardless of whether the devices participating in the calls are "mobile" telecommunication devices, such as cellular phones.

To offer discounted or free mobile-to-mobile calls, a telecommunication service provider determines whether a newly-received call from one of its subscribers is directed to another one of its subscribers. One technique used to determine whether a call is mobile-to-mobile involves the retrieval of information associated with the serving subscriber from subscriber databases. Those databases include home location registers (HLRs) and visitor location registers (VLRs) accessed via a Signaling System Number 7 (SS7) network of the telecommunication service provider. A Service Control Function (SCF) node of the telecommunication service provider that is tasked with determining whether a call is mobile-to-mobile queries the subscriber databases and makes the determination based on the information retrieved from those subscriber databases. This technique often results in substantial congestion of the SS7 network and reduced performance of the subscriber databases given the utilization of that network and those databases for other functions of the telecommunication service provider.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for determining whether newly-received calls are mobile-to-mobile calls between subscribers of a telecommunication service provider. When a subscriber of the telecommunication service provider initiates or receives a new call, an intelligent node of the telecommunication service provider determines whether the new call is a mobile-to-mobile call based on a response to a request from the intelligent node. The intelligent node may be a Service Control Function (SCF) node of the telecommunication service provider that is configured to interact with other nodes and networks of the telecommunication service provider as well as with a charging system.

In some embodiments, the intelligent node is configured to send a state request to an interconnecting network of the telecommunication service provider. This interconnecting network may be an SS7 network, and the request may be received and processed by a node of the SS7 network, such as a Signaling Transfer Point (STP) node. The node of the interconnecting network determines whether a serving subscriber identifier specified in the request received from the intelligent node is included in a routing database of the node. If the identifier is not included, the node responds with an error message. If the identifier is included, the node communicates with a relay function, such as a Mobile Application Part (MAP) signaling relay function, and responds to the request with a state received from the relay function. The state provided in the response may be, for example, a default state. The intelligent node then determines if the response received from the node indicates success (e.g., specifies the default state). If the response indicates the default state, the intelligent node determines that the call is a mobile-to-mobile call.

In additional embodiments, the intelligent node is configured to send an Electronic Number (ENUM) query to an ENUM routing function of the telecommunication service provider. The ENUM routing function is associated with a database that maps telecommunication subscriber identifiers to telecommunication service provider identifiers. Upon receiving the ENUM query specifying an identifier of the serving subscriber, the ENUM routing function determines the telecommunication service provider identifier associated with the serving subscriber identifier in the database and answers the ENUM query with a response specifying the determined telecommunication service provider identifier. The serving subscriber may be a calling party initiating a call or a called party receiving a call. If the specified telecommunication service provider identifier is the identifier of the telecommunication service provider that includes the intelligent node, the intelligent node determines that the call is a mobile-to-mobile call. In other embodiments, the intelligent node determines that the call is a mobile-to-mobile call if the specified telecommunication service provider identifier is the same as the identifier of the telecommunication service provider of the calling party.

These techniques utilize alternative nodes and databases, such as the relay function or ENUM routing function, in place of the subscriber databases and thus relieve the processing burden placed on the subscriber databases by mobile-to-mobile call determinations.

Example Environments

Figure 1:
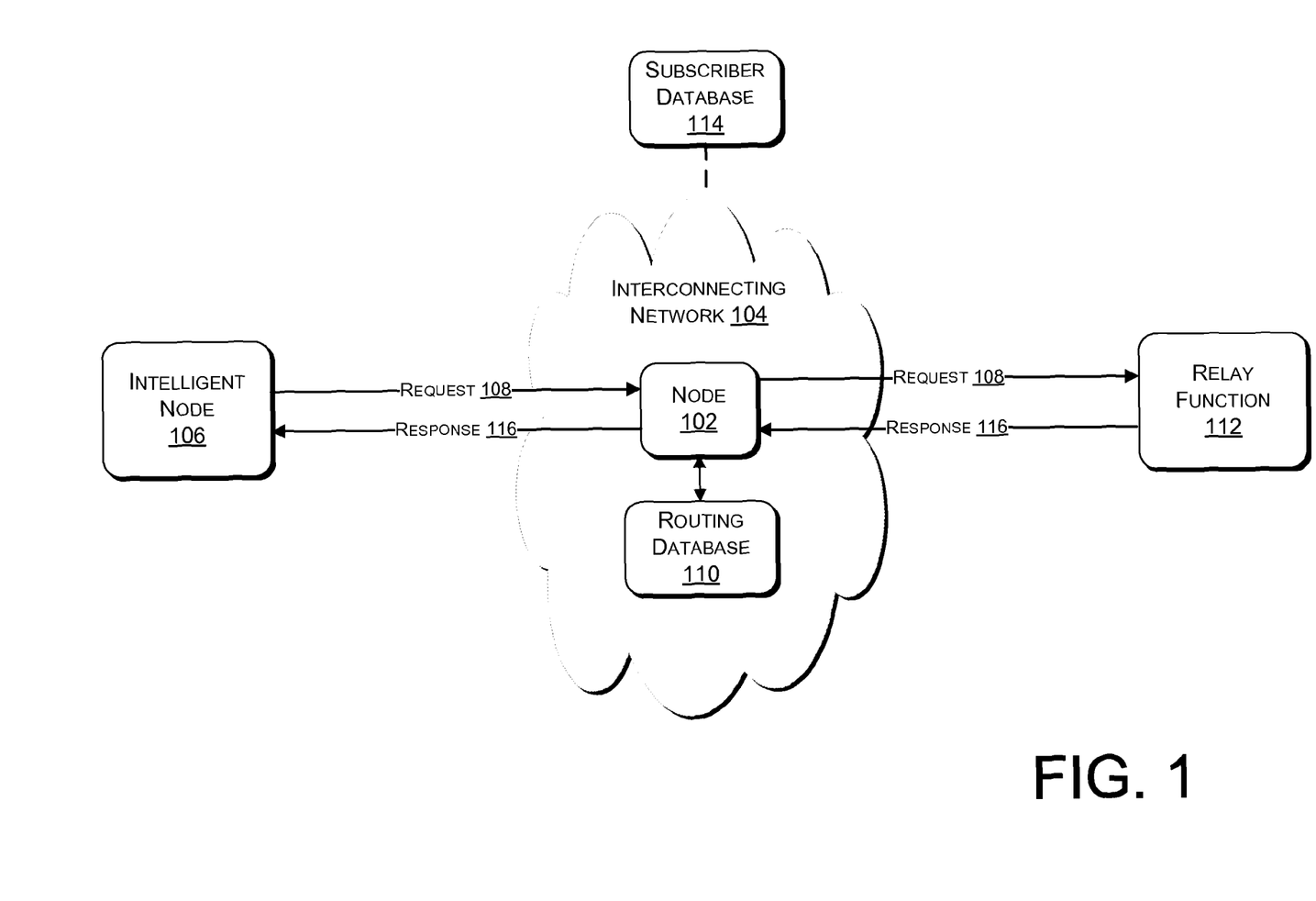
FIG. 1 illustrates an example environment including an interconnecting network that utilizes a relay function in place of a subscriber database when assisting an intelligent node to determine whether a call is a mobile-to-mobile call between subscribers of a telecommunication service provider, in accordance with various embodiments.

FIG. 1 illustrates an example environment including an interconnecting network that utilizes a relay function in place of a subscriber database when assisting an intelligent node to determine whether a call is a mobile-to-mobile call between subscribers of a telecommunication service provider, in accordance with various embodiments. As shown in FIG. 1, a node 102 of an interconnecting network 104 communicates with an intelligent node 106. The intelligent node 106 makes state requests 108 to the interconnecting network 104. Upon receiving a state request 108, the node 102 determines whether a serving subscriber identifier specified in the state request 108 is included in a routing database 110 of node 102. If the serving subscriber identifier is included in the routing database 110, the node 102 communicates with a relay function 112, the relay function being utilized in place of a subscriber database 114 and in place of the interconnecting network 104. The node 102 then provides a state, such as a default state, received from the relay function 112 as a response 116 to the state request 108. If the serving subscriber identifier is not included in the routing database 110, the node 102 responds with an error message response 116. The intelligent node 106 then determines whether a call associated with the state request 108 is a mobile-to-mobile call based on whether the response 116 indicates success (e.g., specifies the default state).

In various embodiments, the node 102, interconnecting network 104, intelligent node 106, routing database 110, relay function 112, and subscriber database 114 belong to a telecommunication service provider network. The telecommunication service provider network may receive calls from its subscribers or directed to its subscribers and connect those calls to the serving subscribers, which may or may not be subscribers of the telecommunication service provider. These calls may be voice calls, video calls, or calls of any type. These subscribers may call from any sort of devices, such as telecommunication devices, personal computers, and media players, among others. Upon receiving a call initiation from a subscriber device or a call initiation directed to a subscriber device, a node of the telecommunication service provider network, such as a Mobile Switching Center (MSC), communicates with the intelligent node 106, requesting that the intelligent node 106 perform service control functions associated with the call, including a determination of whether the call is mobile-to-mobile call. The request made of the intelligent node 106 may be made in accordance with the Customized Application for Mobile Application Logic (CAMEL) Application Protocol (CAP).

Upon determining whether the call is a mobile-to-mobile call, the intelligent node 106 may interact with a charging system to reserve funds based on the mobile-to-mobile call determination to reserve funds. The charging system may be a part of the telecommunication service provider network or may be a system of an external vendor handling service charges for the telecommunication service provider. The intelligent node 106 may then continue the establishing of the call or hand control of processing the call imitation to another node of the telecommunication service provider network that manages the establishing of calls. The telecommunication service provider network may also include a number of other nodes configured to serve varying roles.

In some embodiments, the telecommunication service provider network includes any one or more networks, such as cellular networks and/or data networks, including wide area networks (WANs), local area network (LANs), personal area network (PANs), and/or the Internet. A connection between nodes of the telecommunication service provider network may be through a number of routers, base stations, and/or devices acting as bridges between networks. Communications between the nodes utilize any sort of communication protocol known in the art for sending and receiving messages, such as Transmission Control Protocol/Internet Protocol (TCP/IP), HyperText Transfer Protocol (HTTP), or one or more other protocols, such as those describer further herein. Also, the telecommunication service provider network may be associated with a single geographic location or with a number of dispersed geographic locations. Because the nodes of the telecommunication service provider network may be remote from each other geographically, communications between the nodes may be secured by VPNs and network tunnels or by point-to-point connections.

In various embodiments, the node 102 and intelligent node 106 each represent one or more computing devices, as personal computers (PCs), laptop computers, workstations, server systems, mainframes, routers, switches, or server farms. Also, either or both of the node 102 or intelligent node 106 may be implemented on a virtual machine sharing a physical device with one or more other nodes of the telecommunication service provider network. An example computing device is illustrated in greater detail in FIG. 5 and is described in detail below with reference to that figure.

As mentioned above, the node 102 is part of an interconnecting network 104 of the telecommunication service provider network and communicates with nodes outside of the interconnecting network 104. Such a node 102 may be a STP node and may be associated with a routing database 110 to enable the node 102 to communicate with other nodes. The routing database 110 may be any sort of data structure, file, or database known in the art and may contain mappings of telecommunication subscriber identifiers to a subscriber database 114. The routing database 110 may be stored on the same computing device implementing the node 102 or may be stored on another computing device of the interconnecting network 104. Also, the routing database 110 includes identifiers of substantially all of the subscribers of the telecommunication service provider associated with the telecommunication service provider network of FIG. 1. In one embodiment, the routing database 110 may be a Global System for Mobile Communication (GSM) Flexible Numbering for HLR routing (GFlex) database 110.

The node 102 is configured to receive state requests 108 from an intelligent node 106 and to retrieve a subscriber state associated with a telecommunication subscriber, such as a serving subscriber, that is identified in the request 108. In some embodiments, the state request 108 is a MAP Any Time Interrogation (ATI) request 108. The node 102 then processes the request 108 by determining if a serving subscriber identified in the request 108 is included in the routing database 110. The called party identifier is specified in a Signaling Connection Control Part (SCCP) layer of the SS7 protocol in the request 108 by a Mobile Subscriber Integrated Services Digital Network Number (MSISDN). In response to determining that the serving subscriber identifier is not included in the routing database 110, the node 102 responds with an error message response 116, which may be a MAP ATI response 116. If the serving subscriber identifier is included in the routing database 110, the node 102 communicates with a relay function 112 to retrieve a state value (e.g., a default state value). The node 102 communicates with the relay function 112 in place of the subscriber database 114 associated with the serving subscriber identifier in the routing database 110 in order to reduce the processing burden on the subscriber database 114. Upon receiving a response 116 from the relay function, the node 102 provides the response 116, such as a MAP ATI response 116 that indicates success (e.g. by including the default state), to the intelligent node 106.

In various embodiments, the interconnecting network 104 that includes the node 102 may be an SS7 protocol network within the telecommunication service provider network of FIG. 1. The interconnecting network 104 includes one or more wide area networks (WANs), local area network (LANs), and/or personal area network (PANs), and/or the Internet. A connection between nodes of the interconnecting network 104 or with outside devices may be through a number of routers or devices acting as bridges between networks.

In addition to node 102 and its routing database 110, the interconnecting network 104 provides access to subscriber databases 114. These subscriber databases 114 may include HLRs and VLRs, which store locations, subscription data, and other information associated with subscribers of the telecommunication service provider.

The intelligent node 106, as mentioned above, receives requests to perform service control functions from MSCs in response to call initiations by subscriber devices. Such an intelligent node 106 may be a SCF node of the telecommunication service provider network and among its service control functions, may determine whether initiated calls are mobile-to-mobile calls between subscribers of the telecommunication service provider. To determine whether a call is a mobile-to-mobile call, the intelligent node 106 sends a state request 108 specifying an identifier of the serving subscriber to the interconnecting network 104, receives a response 116 to the request 108, and determines the call type based on the response 116. As mentioned above, the state request 108 may be a MAP ATI request 108 and the response 116 may be a MAP ATI response 116. In some embodiments, the intelligent node 106 determines that the call is a mobile-to-mobile call if the response 116 indicates success (e.g., specifies a default state). An error message response 116 or other sort of response 116 may result in a determination that the call is not a mobile-to-mobile call. The intelligent node 106 may then interact with a charging system to reserve funds. The intelligent node 106 may also inform the charging system of whether the call is a mobile-to-mobile call to ensure that the call is properly charged in accordance with the subscriber's plan.

In various embodiments, the relay function 112 is a service that receives a request 108 from the node 102 and provides a state value (e.g., a default state value) as a response 116 to the request 108. As mentioned above, the relay function 112 may be a MAP signaling relay function 112. The relay function 112 may reside on any node of the telecommunication service provider network and may be included in or outside of the interconnecting network.

Figure 2:
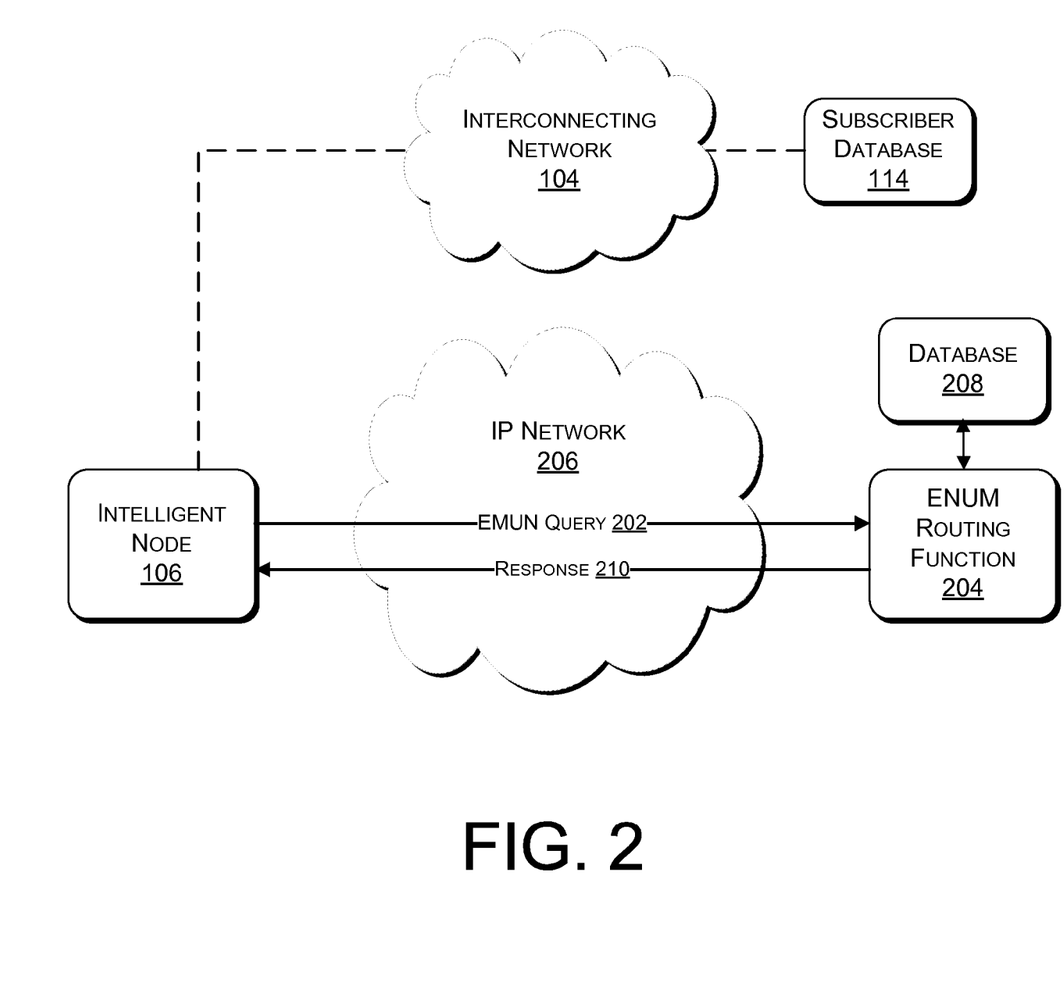
FIG. 2 illustrates an example environment including an intelligent node that is configured to utilize a routing function in place of an interconnecting network when determining whether a call is a mobile-to-mobile call between subscribers of a telecommunication service provider, in accordance with various embodiments.

FIG. 2 illustrates an example environment including an intelligent node that is configured to utilize a routing function in place of an interconnecting network when determining whether a call is a mobile-to-mobile call between subscribers of a telecommunication service provider, in accordance with various embodiments. As shown in FIG. 2, in response to a call initiation or reception of a call, an intelligent node 106 sends an ENUM query 202 specifying a serving subscriber identifier to an ENUM routing function 204 over an IP network 206. The ENUM routing function 204 queries a database 208 associated with the ENUM routing function 204 to determine a telecommunication service provider identifier that is mapped to the serving subscriber identifier. The ENUM routing function 204 responds to the DNS query 202 with a response 210 that specifies the retrieved telecommunication service provider identifier. The intelligent node 106 then determines whether the call is a mobile-to-mobile call based on the telecommunication service provider identifier, thus utilizing the ENUM routing function 204 in place of the interconnecting network 104 in making the mobile-to-mobile call determination.

Like the example environment illustrated in FIG. 1, the example environment of FIG. 2 also represents a telecommunication service provider network. The intelligent node 106, routing function 204, database 208, and interconnecting network 104 may belong to such a telecommunication service provider network. The telecommunication service provider network may receive calls from or to its subscribers and connect those calls to the serving subscribers, which may or may not be subscribers of the telecommunication service provider. These calls may be voice calls, video calls, or calls of any type. These subscribers may call from any sort of devices, such as telecommunication devices, personal computers, and media players, among others. Upon receiving a call initiation from a subscriber device or a call directed to a subscriber device, a node of the telecommunication service provider network, such as an MSC, communicates with the intelligent node 106, requesting that the intelligent node 106 perform service control functions associated with the call, including a determination of whether the call is mobile-to-mobile call. The request made of the intelligent node 106 may be made in accordance with the CAP protocol. Upon determining whether the call is a mobile-to-mobile call, the intelligent node 106 may interact with a charging system to reserve funds. The charging system may be a part of the telecommunication service provider network or may be a system of an external vendor handling service charges for the telecommunication service provider. The intelligent node 106 may then complete the establishing of the call or hand control of processing the call imitation to another node of the telecommunication service provider network that manages the establishing of calls. The telecommunication service provider network may also include a number of other nodes configured to serve varying roles.

In some embodiments, the telecommunication service provider network includes any one or more networks, such as cellular networks and/or data networks, including wide area networks (WANs), local area network (LANs), personal area network (PANs), and/or the Internet. A connection between nodes of the telecommunication service provider network may be through a number of routers, base stations, and/or devices acting as bridges between networks. Communications between the nodes utilize any sort of communication protocol known in the art for sending and receiving messages, such as Transmission Control Protocol/Internet Protocol (TCP/IP), HyperText Transfer Protocol (HTTP), or one or more other protocols, such as those describer further herein. Also, the telecommunication service provider network may be associated with a single geographic location or with a number of dispersed geographic locations. Because the nodes of the telecommunication service provider network may be remote from each other geographically, communications between the nodes may be secured by VPNs and network tunnels or by point-to-point connections.

As described above, the intelligent node 106 represents one or more computing devices and may be implemented on a virtual machine sharing a physical device with one or more other nodes of the telecommunication service provider network. Also as mentioned, the intelligent node 106 receives requests to perform service control functions from MSCs in response to call initiations by subscriber devices. Such an intelligent node 106 may be a SCF node of the telecommunication service provider network and among its service control functions, may determine whether initiated calls are mobile-to-mobile calls between subscribers of the telecommunication service provider. To determine whether a call is a mobile-to-mobile call, the intelligent node 106 sends a DNS query 202 specifying an identifier of the serving subscriber to an ENUM routing function 204 via an IP network 206. The identifier of the serving subscriber is provided in the form of an MSISDN. The intelligent node 106 sends this DNS query 202 to the ENUM routing function 204 in place of sending a state request 108 to the interconnecting network 104, thereby reducing the load on the interconnecting network 104. The DNS query 202 may also be referred to as an ENUM query 202. In response to the DNS query 202, the intelligent node 106 receives a response 210 specifying an identifier of a telecommunication service provider associated with the serving subscriber. The intelligent node 106 then determines if the call is a mobile-to-mobile call based on the response 210. In one embodiment, the intelligent node 106 compares the telecommunication service provider identifier specified in the response 210 to an identifier of the telecommunication service provider associated with the intelligent node 106 and the telecommunication service provider network. In another embodiment, the intelligent node 106 compares the telecommunication service provider identifier specified in the response 210 to an identifier of the telecommunication service provider that the subscriber subscribes to. In the compared identifiers match, the intelligent node 106 determines that the call is a mobile-to-mobile call. The intelligent node 106 may then interact with a charging system to reserve funds.

In various embodiments, the ENUM routing function 204 maps identifiers provided in a standard telephony format to IP addresses. The ENUM routing function 204 may reside on any node of the telecommunication service provider network or may be implemented on a device or devices outside of the telecommunication service provider network. In response to receiving a DNS query 202 specifying an identifier of a called party, the ENUM routing function 204 locates the serving subscriber identifier in an associated database 208 and retrieves an identifier of a telecommunication service provider that the serving subscriber subscribes to. If the serving subscriber identifier is not found in the database 208 then a value indicating that the called party identifier is "unknown" may be used. The database 208 may be any sort of data structure, file, or database known in the art and may contain mappings of telecommunication subscriber identifiers to telecommunication service provider identifiers. The database 208 may be stored on the same computing device(s) implementing the ENUM routing function 204 or may be stored on other computing device(s). After retrieving the telecommunication service provider identifier from the database 208, the ENUM routing function 204 returns the telecommunication service provider identifier to the intelligent node 106 in a response 210.

In some embodiments, the IP network 206 includes any one or more wide area networks (WANs), local area network (LANs), personal area network (PANs), and/or the Internet. The IP network 206 may be part of the telecommunication service provider network or may be separate from the telecommunication service provider network. Communications between devices connected to the IP network 206 utilize any sort of communication protocols known in the art for sending and receiving messages, such as TCP/IP, HTTP, or one or more other protocols.

Example Operations

Figure 3:
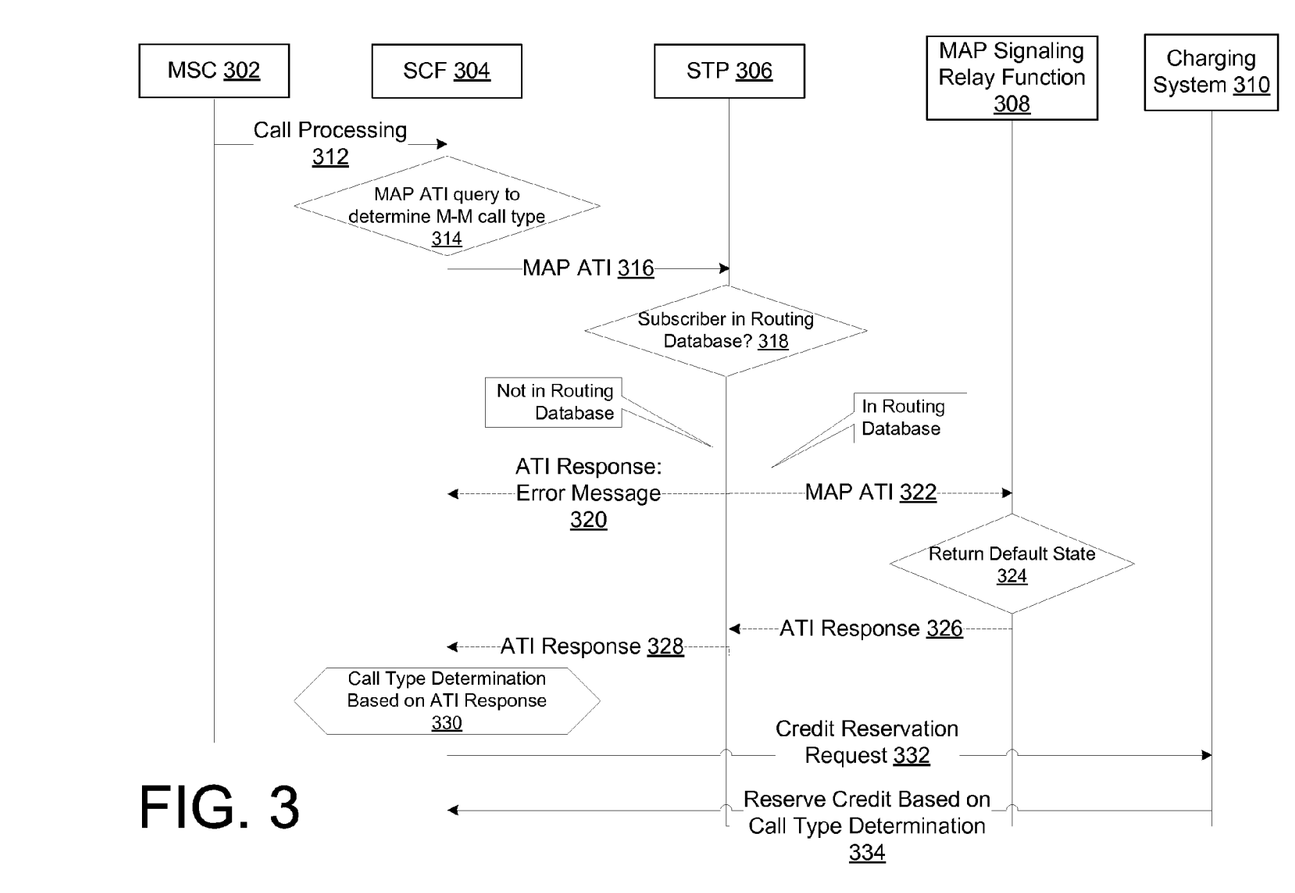
FIG. 3 illustrates a flowchart of example operations performed by example devices of the environment shown in FIG. 1, in accordance with various embodiments.

FIG. 3 illustrates a flowchart of example operations performed by example devices of the environment shown in FIG. 1, in accordance with various embodiments. As illustrated in FIG. 3, an MSC 302, a SCF 304, a STP 306, a MAP signaling relay function 308, and a charging system 310 may interact through a series of communications to determine whether an initiated call is a mobile-to-mobile call. The MSC 302, SCF 304, STP 306, MAP signaling relay function 308, and charging system 310 may be nodes or devices of a telecommunication service provider network, such as the telecommunication service provider network shown and described with reference to FIG. 1. For example, the SCF 304 may be an intelligent node 106, the STP 306 may be a node 102, and the MAP signaling relay function 308 may be a relay function 112.

In various embodiments, the MSC 302 requests 312 call processing, such as call service control functions, from SCF 304. The request 312 for call processing may be a CAP request and may specify an identifier of the serving subscriber, such as a MSISDN.

The SCF 304 then formulates 314 a MAP ATI query, such as a subscriber state request, for transmission to the STP 306. The MAP ATI query includes the MSISDN of the serving subscriber in an SCCP layer of the SS7 protocol. The SCF 304 then transmits 316 the MAP ATI query to the STP 306.

Upon receiving the MAP ATI query, the STP 306 determines 318 if the MSISDN of the serving subscribers included in a routing database of the STP 306. Such a routing database may be a GFlex database. If the MSISDN is not found in the routing database, the STP 306 responds 320 with an error message as the MAP ATI response. If the MSISDN is found in the routing database, the STP 306 communicates 322 the MAP ATI query to the MAP signaling relay function 308.

The MAP signaling relay function 308 formulates 324 a response to the MAP ATI query, indicating a default subscriber state, such as "Idle" in the MAP ATI response. The MAP signaling relay function 308 then sends 326 the MAP ATI response indicating the default subscriber state to the STP 306, which in turn sends 328 the MAP ATI response to the SCF 304.

The SCF 304 then determines 330 whether the call is a mobile-to-mobile call based on whether the MAP ATI response indicates the default subscriber state or an error message, the default subscriber state indicating that the call is a mobile-to-mobile call. In some embodiments, the determination 330 may be based at least in part on a response type associated with the MAP ATI response.

In various embodiments, the SCF 304 then interacts with the charging system 310, providing 332 a credit reservation request and receiving 334 a reservation of credit based on the call type determination in response.

Figure 4:
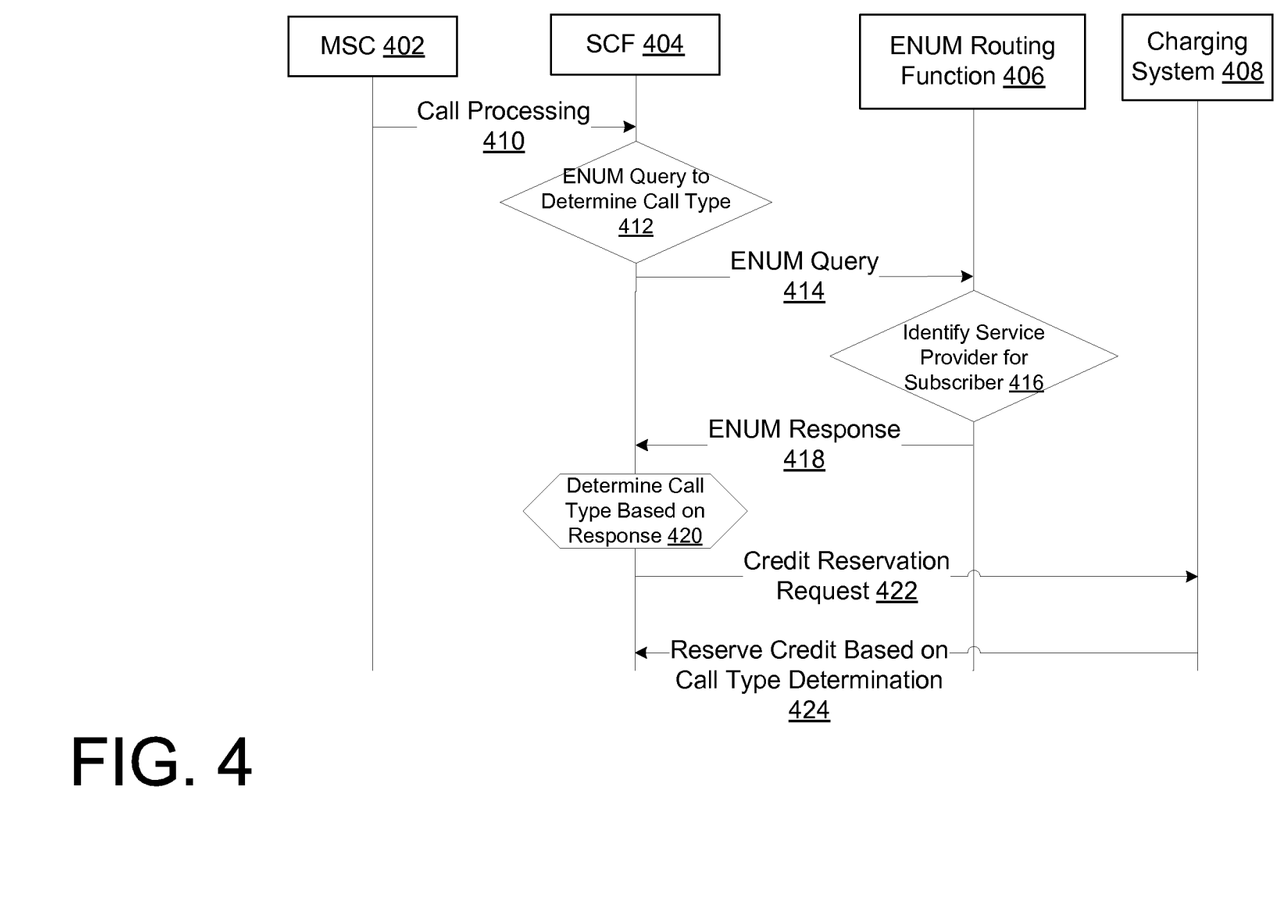
FIG. 4 illustrates a flowchart of example operations performed by example devices of the environment shown in FIG. 2, in accordance with various embodiments.

FIG. 4 illustrates a flowchart of example operations performed by example devices of the environment shown in FIG. 2, in accordance with various embodiments. As illustrated in FIG. 4, an MSC 402, a SCF 404, an ENUM routing function 406, and a charging system 408 may interact through a series of communications to determine whether an initiated call is a mobile-to-mobile call. The MSC 402, SCF 404, ENUM routing function 406, and charging system 408 may be nodes or devices of a telecommunication service provider network, such as the telecommunication service provider network shown and described with reference to FIG. 2. For example, the SCF 404 may be an intelligent node 106 and the ENUM routing function 406 may be an ENUM routing function 204.

In various embodiments, the MSC 402 requests 410 call processing, such as call service control functions, from SCF 404. The request 410 for call processing may be a CAP request and may specify an identifier of the serving subscriber, such as a MSISDN.

The SCF 404 then formulates 412 an ENUM query, such as a DNS query, for transmission to the ENUM routing function 406. The ENUM query includes the MSISDN of the serving subscriber. The SCF 404 then transmits 414 the ENUM query to the ENUM routing function 406.

Upon receiving the ENUM query, the ENUM routing function 406 determines 416 if the MSISDN of the serving subscribers included in a database that maps MSISDNs to identifiers of telecommunication service providers. The ENUM routing function 406 then retrieves the telecommunication service provider identifier associated with the MSISDN of the serving subscriber from the database and provides 418 the telecommunication service provider identifier in response to the ENUM query. If the MSISDN was not located in the database, the ENUM routing function 406 returns a value indicating that the MSISDN is unknown.

The SCF 404 then determines 420 whether the call is a mobile-to-mobile call based on whether the telecommunication service provider identifier specified in the response matches either an identifier of the telecommunication service provider associated with the SCF 404 or an identifier of the telecommunication service provider to which the caller subscribes.

In various embodiments, the SCF 404 then interacts with the charging system 408, providing 422 a credit reservation request and receiving 424 a reservation of credit based on the call type determination in response.

Example System

Figure 5:
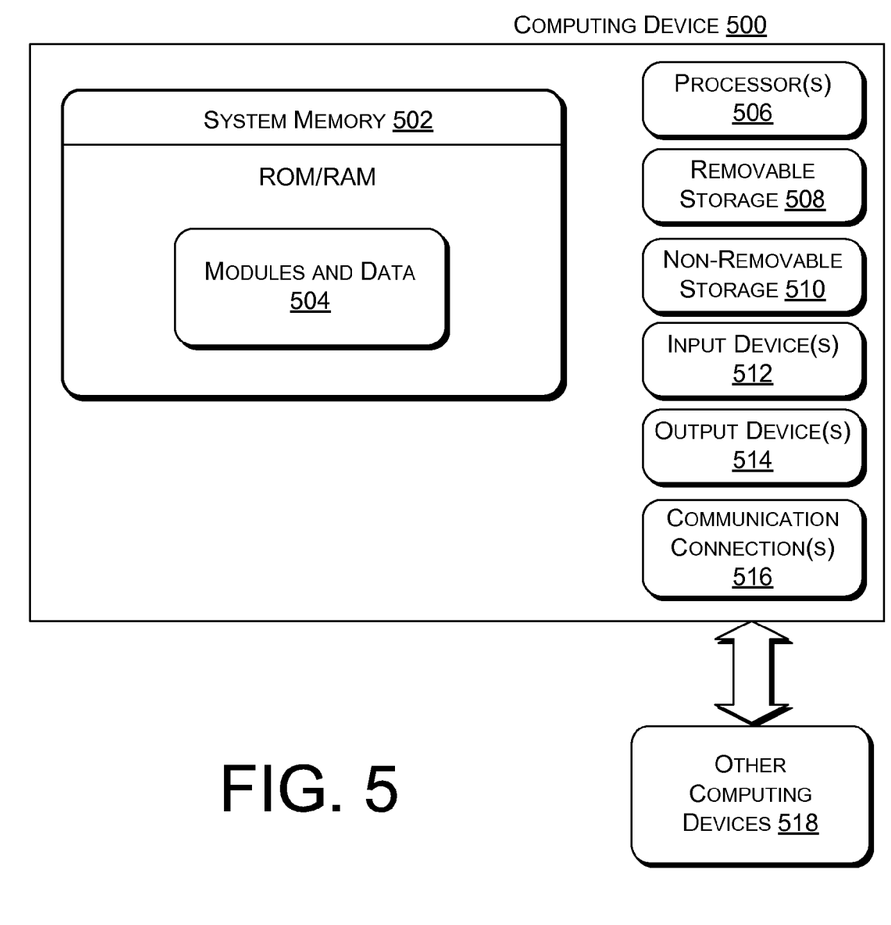
FIG. 5 illustrates a component level view of a computing device capable of acting as an intelligent node or node of an interconnecting network, in accordance with various embodiments.

FIG. 5 is a component level view of a computing device capable of acting as an intelligent node 106 or node 102 of an interconnecting network 104, in accordance with various embodiments. As illustrated, computing device 500 comprises a system memory 502 storing modules and data 504. Also, computing device 500 includes processor(s) 506, a removable storage 508 and non-removable storage 510, input device(s) 512, output device(s) 514 and communication connections 516 for communicating with other computing devices 518.

In various embodiments, system memory 502 is volatile (such as RAM), non-volatile (such as ROM, flash memory, etc.) or some combination of the two. The modules or data 504 stored in the system memory 502 may comprise methods, threads, processes, applications or any other sort of executable instructions, such as the instructions utilized to perform the operations of the intelligent node 106 or the node 102. The modules and data 504 may also include files and databases, such as routing database 110.

In some embodiments, the processor(s) 506 is a central processing unit (CPU), a graphics processing unit (GPU), or both CPU and GPU, or other processing unit or component known in the art.

Computing device 500 also includes additional data storage devices (removable and/or non-removable) such as, for example, magnetic disks, optical disks, or tape. Such additional storage is illustrated in FIG. 5 by removable storage 508 and non-removable storage 510. Computer storage media may include volatile and nonvolatile, removable and non-removable media implemented in any method or technology for storage of information, such as computer readable instructions, data structures, program modules, or other data. System memory 502, removable storage 508 and non-removable storage 510 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer-readable storage media may be part of the computing device 500.

Computing device 500 also has input device(s) 512, such as a keyboard, a mouse, a touch-sensitive display, voice input device, etc., and output device(s) 514 such as a display, speakers, a printer, etc. These devices are well known in the art and need not be discussed at length here.

Computing device 500 also contains communication connections 516 that allow the computing device 500 to communicate with other computing devices 518, such as other computing devices of the telecommunication service provider.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A system comprising:
a Service Control Function (SCF) node including a processor and executable instructions configured to be operated by the processor to determine whether a call is a mobile-to-mobile call between subscribers of a telecommunication service provider by:
sending a subscriber state request specifying an identifier of a serving subscriber of the call to a Signaling System Number 7 (SS7) network, and
determining that the call is a mobile-to-mobile call if a response to the subscriber state request indicates success; and
a Signaling Transfer Point (STP) node of the SS7 network including a processor and executable instructions configured to be operated by the processor to:
determine whether the serving subscriber identifier is included in a routing database of the STP node,
in response to determining that the serving subscriber identifier is included in the routing database, communicating with a relay function and responding to the subscriber state request with a default state indicated by the relay function, the relay function being used in place of a subscriber database of the telecommunication service provider, and
in response to determining that the serving subscriber identifier is not included in the routing database, responding to the subscriber state request with an error message.

2. The system of claim 1, wherein the relay function is a Mobile Application Part (MAP) signaling relay function of the system that receives requests from the STP node and provides the default subscriber state in answer to the requests.

3. The system of claim 1, wherein the serving subscriber identifier is a Mobile Subscriber Integrated Services Digital Network (MSISDN) number.

4. A method comprising:
receiving, by a node of an interconnecting network, a request specifying an identifier of a serving subscriber of a call;
determining, by the node, whether the serving subscriber identifier is included in a routing database of the node;
in response to determining that the serving subscriber identifier is not included in the routing database, responding to the request with an error message; and
in response to determining that the serving subscriber identifier is included in the routing database, communicating with a relay function and responding to the request with a state indicated by the relay function, the relay function being used in place of a subscriber database and the state indicated by the relay function enabling a call type determination for the call.

5. The method of claim 4, wherein the error message enables a determination that the call is not a mobile-to-mobile call.

6. The method of claim 4, wherein communicating with the relay function comprises sending the request to the relay function and receiving a response from the relay function.

7. The method of claim 6, wherein the responding to the request with the state indicated by the relay function comprises sending the response from the relay function as the response to the request.

8. The method of claim 6, wherein the relay function is a Mobile Application Part (MAP) signaling relay function that receives requests and provides a default state in answer to the requests.

9. The method of claim 4, wherein the node is a Signaling Transfer Point (STP) and the interconnecting network is a Signaling System Number 7 (SS7) network.

10. The method of claim 4, wherein the subscriber database includes home location registers (HLR) and visitor location registers (VLR) of a telecommunication service provider and the routing database maps subscribers of the telecommunication service provider to the HLRs.

11. The method of claim 4, wherein the request is a MAP Any Time Interrogation (MAP ATI) request received from an intelligent node.

12. The method of claim 11, wherein the intelligent node determines the call type based on the response received from the node.

13. The method of claim 12, wherein the intelligent node conditionally reserves funds at a charging system based on whether the call is determined to be a mobile-to-mobile call.

14. A method comprising:
sending, by an intelligent node, an Electronic Number (ENUM) query specifying an identifier of a serving subscriber of a call;
receiving, in response, by the intelligent node, an identifier of a telecommunication service provider associated with the serving subscriber; and
determining, by the intelligent node, whether the call is a mobile-to-mobile call based at least in part on the telecommunication service provider identifier.

15. The method of claim 14, wherein the intelligent node is a service control function (SCF) node.

16. The method of claim 14, wherein the intelligent node sends the ENUM query in place of a request to a Signaling System Number 7 (SS7) network for a subscriber state.

17. The method of claim 14, wherein the ENUM query is directed to an ENUM routing function of a telecommunication service provider.

18. The method of claim 17, wherein the ENUM routing function is associated with a database mapping telecommunication subscriber identifiers to telecommunication service provider identifiers.

19. The method of claim 18, wherein the determining comprises determining whether the telecommunication service provider identifier included in the response is associated with a calling party of the call.

20. The method of claim 14, further comprising conditionally reserves funds at a charging system based on whether the call is determined to be a mobile-to-mobile call.

* * * * *